US012162662B2

(12) United States Patent
Rosenbrien

(10) Patent No.: US 12,162,662 B2
(45) Date of Patent: Dec. 10, 2024

(54) PRODUCT PACKAGE, CARRIER, AND BLANK THEREFOR

(71) Applicant: WestRock MWV, LLC, Atlanta, GA (US)

(72) Inventor: Cullen B. Rosenbrien, Richmond, VA (US)

(73) Assignee: WestRock MWV, LLC, Atlanta, GA (US)

( * ) Notice: Subject to any disclaimer, the term of this patent is extended or adjusted under 35 U.S.C. 154(b) by 838 days.

(21) Appl. No.: 16/827,153

(22) Filed: Mar. 23, 2020

(65) Prior Publication Data

US 2021/0292067 A1 Sep. 23, 2021

(51) Int. Cl.
*B65D 73/00* (2006.01)
*B31B 50/82* (2017.01)
*B31B 50/86* (2017.01)

(52) U.S. Cl.
CPC .......... *B65D 73/0085* (2013.01); *B31B 50/82* (2017.08); *B31B 50/86* (2017.08)

(58) Field of Classification Search
CPC .......................... B65D 73/0085; B65D 75/322
USPC ....... 206/462, 463, 467, 470, 471, 486, 493, 206/776–780, 806
See application file for complete search history.

(56) References Cited

U.S. PATENT DOCUMENTS 2,984,401 A * 5/1961 Herkender ........... B65D 5/0209 206/362.4
3,184,046 A * 5/1965 Berg .................... B65D 5/5002 206/780
3,239,177 A * 3/1966 Samsing ............ B65D 73/0021 248/152
3,437,193 A * 4/1969 Freeman ............ B65D 71/0066 248/152
3,486,615 A * 12/1969 De .......................... B65B 11/52 229/125.35
3,497,059 A * 2/1970 Ridley, Jr. ............... B65B 11/52 264/296
3,918,583 A * 11/1975 Adams ............... B65D 73/0085 206/782
4,354,598 A * 10/1982 Schillinger ........ B65D 73/0085 206/476
4,549,654 A * 10/1985 Tiesman ............ B65D 73/0085 248/152
4,570,787 A * 2/1986 Forbes, Jr. ......... B65D 73/0085 206/780
6,036,024 A * 3/2000 Seidler ............... B65D 73/0085 431/291
8,955,682 B2 * 2/2015 Lechevalier ........... B65D 71/38 206/779
2008/0035518 A1 * 2/2008 Markham .......... B65D 73/0085 206/495

* cited by examiner

*Primary Examiner* — Luan K Bui
(74) *Attorney, Agent, or Firm* — Neil G. Cohen; Rohini K. Garg

(57) ABSTRACT

Aspects of the disclosure relate to a package, a product carrier, and a blank for forming the product carrier. An aspect of the invention provides a package comprising a display card and an article disposed therein. The display card comprises a front panel and a rear panel. At least one first opening is provided in the front panel. A first portion of an article is received in the at least one first opening. At least one second opening is provided in the rear panel. A second portion of the article is received in the at least one second opening.

38 Claims, 5 Drawing Sheets

PRODUCT PACKAGE, CARRIER, AND BLANK THEREFOR

TECHNICAL FIELD

The present invention relates to product packaging, to carriers or display cards, and to blanks for forming the same. More specifically, but not exclusively, the invention relates to a carrier providing a display card having front and rear panels spaced apart from each other and each having an opening for receiving a portion of an article and to a blank for forming the display card.

BACKGROUND

In the field of packaging it is known to provide display cards for mounting to articles or products thereto. Display cards are well known in the art and are useful for display of product information to a consumer, display of the articles in a retail environment and enabling consumers to transport, store and access the product.

Manufacturers and retailers of consumer goods, such as pharmaceuticals, software, electronics, health and beauty products, hand tools and the like, typically package their products in tamper resistant security packages. For example, many consumer goods are packaged inside a blister or clamshell packages formed by positioning a consumer good in a flanged blister made from various polymeric and/or paperboard materials and sealing the flanged blister between two paperboard substrates. Alternatively, the product may be secured to the paperboard card by cable ties (zip ties), the cable tie passing through a pair of apertures in the paperboard card.

It is desirable to expose some or all of the product, whilst on display, to a consumer to allow inspection of the product and it is desirable to maximise the visual or aesthetic impact the package has upon the consumer.

It is further desirable to provide the consumer with information about the product without hindering the consumer's ability to inspect the product. It is also desirable that the product carrier is resistant to tampering, removal or separation from the product.

The present invention seeks to provide an improvement in product packaging, typically formed from paperboard or the like.

SUMMARY

A first aspect of the present disclosure provides a carrier for packaging at least one article. The carrier comprises a front panel and a rear panel. At least one first opening is provided in the front panel for receiving a first portion of an article. At least one second opening is provided in the rear panel for receiving a second portion of the article. The carrier comprises a first end stop provided by a first edge portion of the front panel and a second edge portion of the rear panel. The first edge portion is defined by a portion of the at least one first opening. The second edge portion being is defined by a portion of the at least one second opening. The second edge portion is coplanar with the first edge portion.

Advantageously, the first end stop provides a ledge upon which a base or end of the article rests when the carrier is in a normal orientation.

Optionally, the carrier comprises a second end stop provided by a third edge portion of the front panel, the third edge portion being defined by a further portion of the at least one first opening; and a fourth edge portion of the rear panel, the fourth edge portion being defined by a further portion of the at least one second opening.

Optionally, the fourth edge portion is coplanar with the third edge portion.

Optionally, the carrier comprises a second end stop provided by an end closure panel extending between the front panel and the rear panel.

Optionally, the front panel is hingedly connected to the rear panel by an end closure panel and a connecting panel, wherein the connecting panel is disposed in face to face relationship with the rear panel.

Optionally, a first side panel is hingedly connected to a first side of the front panel and a second side panel is hingedly connected to a second opposing side of the front panel.

Optionally, a first wing panel is hingedly connected to the first side panel and is secured to the rear panel in face to face relationship therewith.

Optionally, a second wing panel is hingedly connected to the second side panel and is secured to the rear panel in face to face relationship therewith.

Optionally, the carrier comprises a first retention device for retaining the at least one article and provided by a tab in at least one of the front and rear panels and defined by a portion of the at least one first opening or the at least one second opening respectively, each tab being insertable into an orifice in an end or base of the at least one article.

Optionally, the carrier comprises a second retention device for retaining the at least one article and provided by parts of the front and rear panels and defined by sections of the at least one first opening and the at least one second opening, said sections opposing the edge portions of the front and rear panels defining the first end stop.

The second retention device may impede or inhibit movement of a handle of the at least one article.

Optionally, the at least one first opening has a maximum width equal to the width of the front panel.

Optionally, the rear panel comprises a width dimension greater than the width of the front panel.

Optionally, the at least one second opening has a maximum width equal to or less than the maximum width of the at least one first opening in the front panel.

Optionally, the carrier comprises an interior chamber defined, at least in part, by the front panel, rear panel, and first and second side panels, the interior chamber comprises a minimum width dimension and a maximum width dimension, the at least one article comprises a maximum width dimension which is greater than minimum width dimension of the interior chamber and less than maximum width dimension of the interior chamber.

The end closure panel at least partially closes a first end of the interior chamber. The end closure panel may be trapezoidal in shape. A second end of the interior chamber may be an open end.

Optionally, the at least one article comprises a maximum width dimension and the at least one first opening has a maximum width which is less than the maximum width dimension of the at least one article.

Optionally, the at least one second opening has a maximum width which is less than the maximum width dimension of the at least one article.

A second aspect of the present disclosure provides a carrier for packaging a pair of articles. The carrier comprises a front panel and a rear panel. A first opening is provided in the rear panel for receiving a first portion of a first article. A second opening is provided in the rear panel for receiving a first portion of a second article. A third opening is provided in the front panel for receiving a second portion of the second article. A fourth opening is provided in the front panel for receiving a second portion of the first article. The carrier comprises a first end stop for limiting travel of the first article in a first direction. The first end stop is provided by an edge portion of the rear panel and an edge portion of the front panel. The edge portion of the rear panel is defined by a portion of the first opening. The edge portion of the front panel is defined by a portion of the fourth opening and is coplanar with the edge portion of the rear panel. The carrier comprises a second end stop for limiting travel of the second article in the first direction. The second end stop is provided by at least one second edge portion of the rear panel and at least one second edge portion of the front panel. The second edge portion of the rear panel is defined by a portion of the second opening. The second edge portion of the front panel is defined by a portion of the third opening and is coplanar with the second edge portion of the rear panel.

The first and second end stops may each provide a ledge upon which a base or end of the respective one of the first and second articles rests when the carrier is in a normal orientation. The front and rear panels may space the first article apart from the second article. The second article may be supported above the first article when the carrier is in a normal orientation by the front and rear panels.

Optionally the carrier comprises a third end stop for limiting travel of the first article in a second direction. The second direction opposes the first direction. The third end stop is provided by at least one third edge portion of the rear panel and at least one fourth edge portion of the front panel. The at least one third portion of the rear panel is defined by a portion of the first opening. The at least one fourth edge portion of the front panel is defined by a portion of the fourth opening and is coplanar with the at least one third edge portion of the rear panel.

The second and third end stops prevent or inhibit movement of the first and second articles towards each other.

Optionally, the carrier comprises a fourth end stop for limiting travel of the second article in the second direction. The fourth end stop is provided by an end closure panel hingedly connected to an end edge of the front panel.

Optionally, the carrier comprises a first retention device for retaining the first article and provided by a tab in each of the front and rear panels and defined by portions of the first and fourth openings, the tabs being insertable into an orifice in an end of the first article.

Optionally, the carrier comprises a second retention device for retaining the second article and provided by parts of the front and rear panels and defined by sections of the second and third openings, said sections of the second and third openings opposing the portions of the second and third openings defining the second edge portions in the front and rear panels.

A third aspect of the present disclosure provides a package comprising a carrier and one or more articles. The carrier comprises a front panel and a rear panel. At least one first opening is provided in the front panel. A first portion of an article is received in the at least one first opening. At least one second opening is provided in the rear panel. A second portion of the article is received in the at least one second opening. The carrier comprises a first end stop provided by a first edge portion of the front panel and a second edge portion of the rear panel. The first edge portion is defined by a portion of the at least one first opening. The second edge portion is defined by a portion of the at least one second opening. The second edge portion is coplanar with the first edge portion.

Optionally, the at least one first opening has a maximum width equal to the width of the front panel.

Optionally, the rear panel comprises a width dimension greater than the width of the front panel.

Optionally, the at least one second opening has a maximum width equal to or less than the maximum width of the at least one first opening in the front panel.

Optionally, the carrier comprises an interior chamber defined, at least in part, by the front panel, rear panel, a first panel and a second side panel, the interior chamber comprises a minimum width dimension and a maximum width dimension, the at least one article comprises a maximum width dimension which is greater than minimum width dimension of the interior chamber and less than maximum width dimension of the interior chamber.

Optionally, the at least one article comprises a maximum width dimension and the at least one first opening has a maximum width which is less than the maximum width dimension of the at least one article.

Optionally, the at least one second opening has a maximum width which is less than the maximum width dimension of the at least one article.

A fourth aspect of the present disclosure provides a package comprising a carrier and a pair of articles. The carrier comprises a front panel and a rear panel. A first opening is provided in the rear panel. A first portion of a first article is received in the first opening. A second opening is provided in the rear panel. A first portion of a second article is received in the second opening. A third opening is provided in the front panel. A second portion of the second article is received in the third opening. A fourth opening is provided in the front panel. A second portion of the first article is received in the fourth opening. The carrier comprises a first end stop limiting travel of the first article in a first direction. The first end stop is provided by an edge portion of the rear panel and an edge portion of the front panel. The edge portion of the rear panel is defined by a portion of the first opening. The edge portion of the front panel is defined by a portion of the fourth opening and is coplanar with the edge portion of the rear panel. The carrier comprises a second end stop limiting travel of the second article in the first direction. The second end stop is provided by at least one second edge portion of the rear panel and at least one second edge portion of the front panel. The second edge portion of the rear panel is defined by a portion of the second opening. The second edge portion of the front panel is defined by a portion of the third opening and is coplanar with the second edge portion of the rear panel.

Optionally, the third opening has a maximum width equal to the width of the front panel.

Optionally, the fourth opening has a maximum width equal to the width of the front panel.

Optionally, the second opening has a maximum width less than the maximum width of the third opening in the front panel.

Optionally, the first opening has a maximum width equal to the maximum width of the fourth opening in the front panel.

Optionally, the rear panel comprises a width dimension greater than the width of the front panel.

Optionally, the carrier comprises an interior chamber defined, at least in part, by the front panel, rear panel, a first panel and a second side panel, the interior chamber comprises a minimum width dimension and a maximum width dimension, each of the pair of articles comprises a maximum width dimension which is greater than minimum width dimension of the interior chamber and less than maximum width dimension of the interior chamber.

Optionally, the first article comprises a maximum width dimension and the first and fourth openings each have a maximum width which is less than the maximum width dimension of the first article.

Optionally, the second article comprises a maximum width dimension and the second and third openings each have a maximum width which is less than the maximum width dimension of the second article.

A fifth aspect of the present disclosure provides a blank for forming a display card. The blank comprises a front panel and a rear panel. Atop panel is hingedly connected to the front panel. A connection panel is hingedly connected to the top panel and is hingedly connected to the rear panel. The blank comprises first and second side panels hingedly connected to opposing sides of the front panel. A first wing panel is hingedly connected to the first side panel. A second wing panel hingedly connected to the second side panel. The first wing panel, second wing panel and connection panel provide securing panels for securing the display card in a setup condition. The blank comprises at least one first opening providing in the front panel for receiving a first portion of an article and at least one second opening providing in the rear panel for receiving a second portion of the article. The blank comprises a first end stop provided by a first edge portion of the front panel and a second edge portion of the rear panel. The first edge portion is defined by a portion of the at least one first opening. The second edge portion is defined by a portion of the at least one second opening. The second edge portion is coplanar with the first edge portion.

Optionally, the article is an end closure for a drinking vessel.

Within the scope of this application it is envisaged or intended that the various aspects, embodiments, examples, features and alternatives set out in the preceding paragraphs, in the claims and/or in the following description and drawings may be considered or taken independently or in any combination thereof.

Features or elements described in connection with, or relation to, one embodiment are applicable to all embodiments unless there is an incompatibility of features. One or more features or elements from one embodiment may be incorporated into, or combined with, any of the other embodiments disclosed herein, said features or elements extracted from said one embodiment may be included in addition to, or in replacement of one or more features or elements of said other embodiment.

A feature, or combination of features, of an embodiment disclosed herein may be extracted in isolation from other features of that embodiment. Alternatively, a feature, or combination of features, of an embodiment may be omitted from that embodiment.

BRIEF DESCRIPTION OF THE DRAWINGS

Embodiments of the invention will now be described with reference to the accompanying drawings, in which.

DETAILED DESCRIPTION OF EMBODIMENTS

Detailed descriptions of specific embodiments of the product package, product carrier, display card, clip and blank are disclosed herein. It will be understood that the disclosed embodiments are merely examples of the way in which certain aspects of the invention can be implemented and do not represent an exhaustive list of all of the ways the invention may be embodied. As used herein, the word "exemplary" is used expansively to refer to embodiments that serve as illustrations, specimens, models, or patterns. Indeed, it will be understood that the product packages, product carriers, display cards, clips and blanks described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
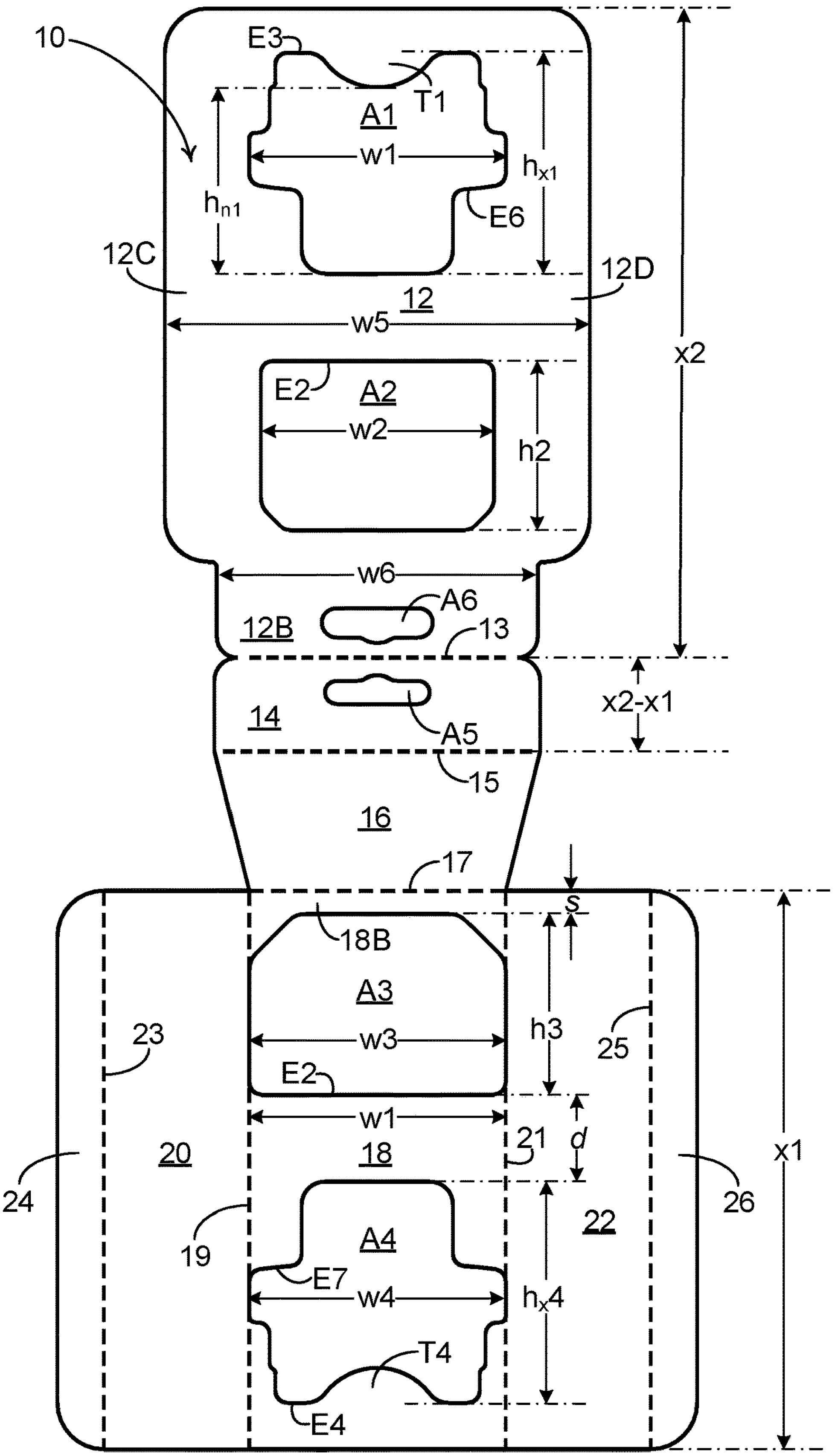
FIG. 1 is a plan view from above of a first blank for forming a product package according to an embodiment of the disclosure.
Figure 2:
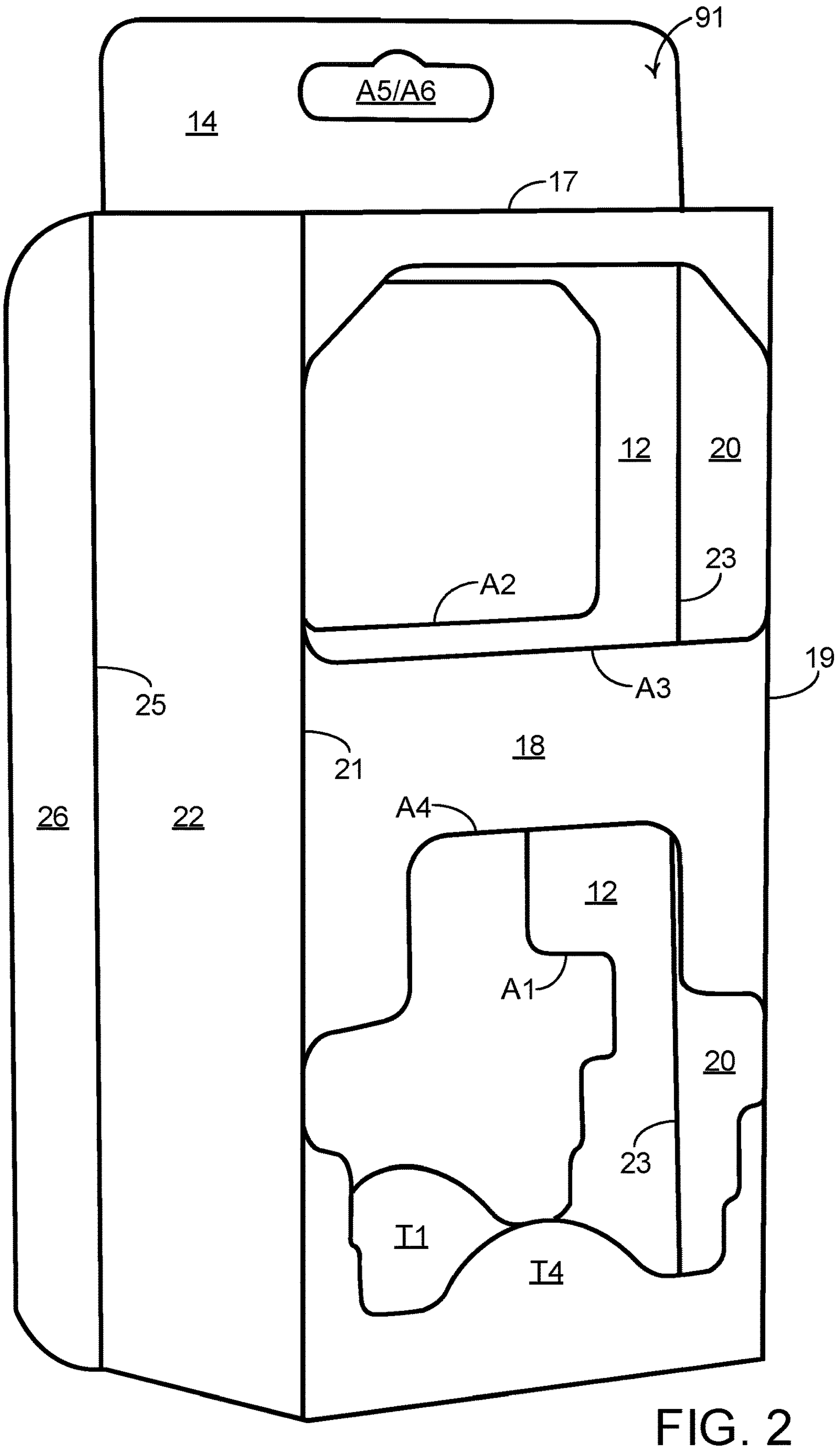
FIG. 2 is a perspective front view of a carrier or display card formed from the blank of FIG. 1.
Figure 3:
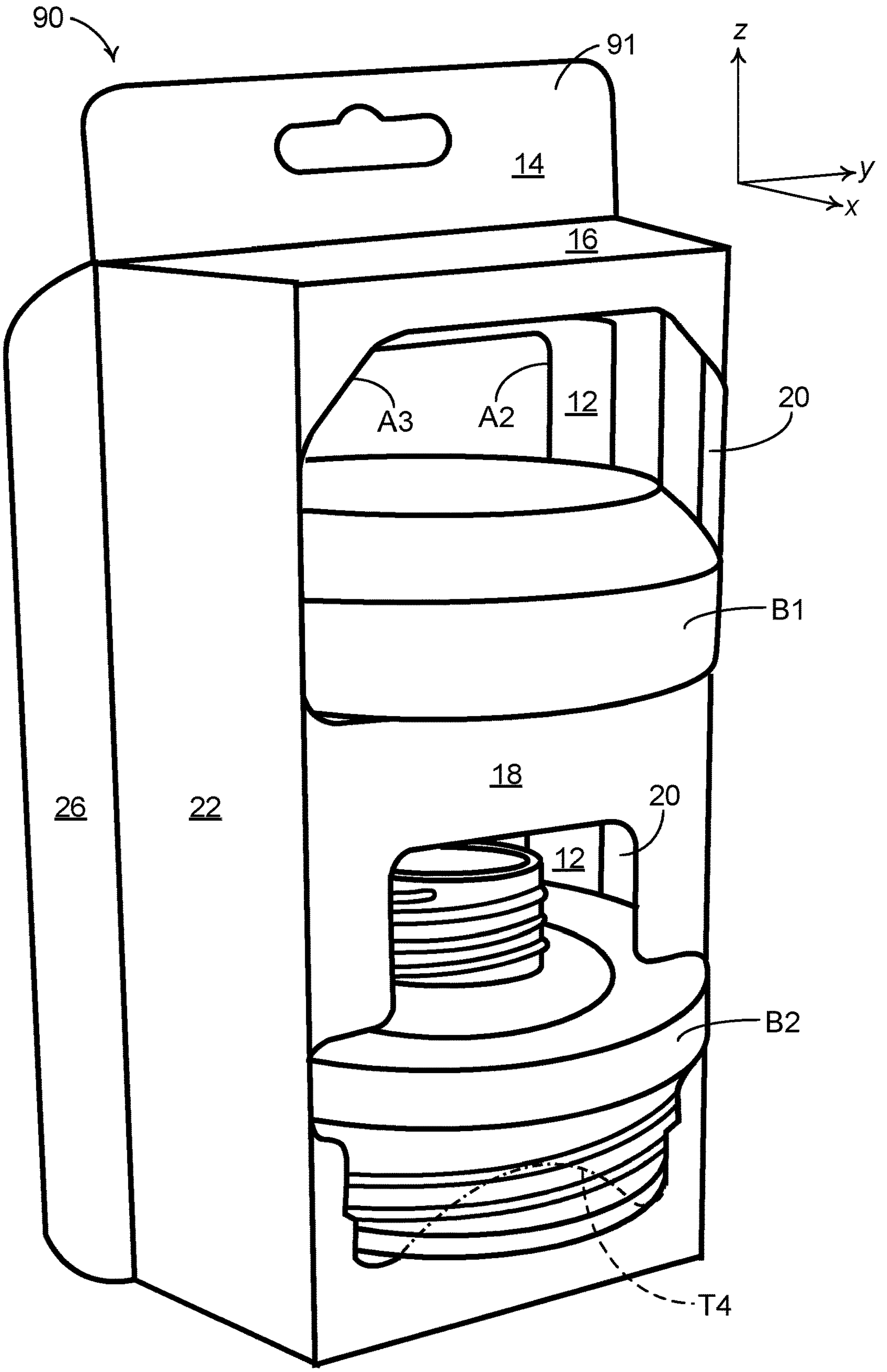
FIG. 3 is a perspective front view of a product package formed from the blank of FIG. 1.
Figure 4A:
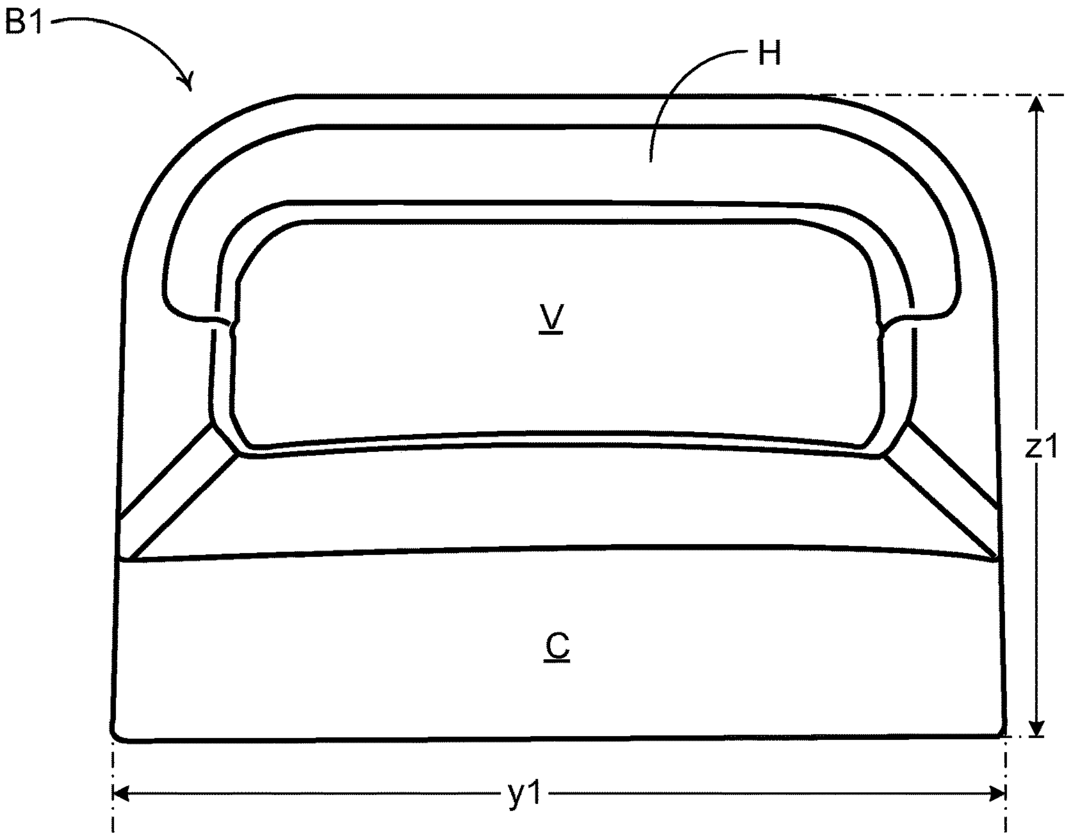
FIGS. 4A and 4B are perspective front views of first and second articles packaged by the carrier of FIG. 2.
Figure 4B:
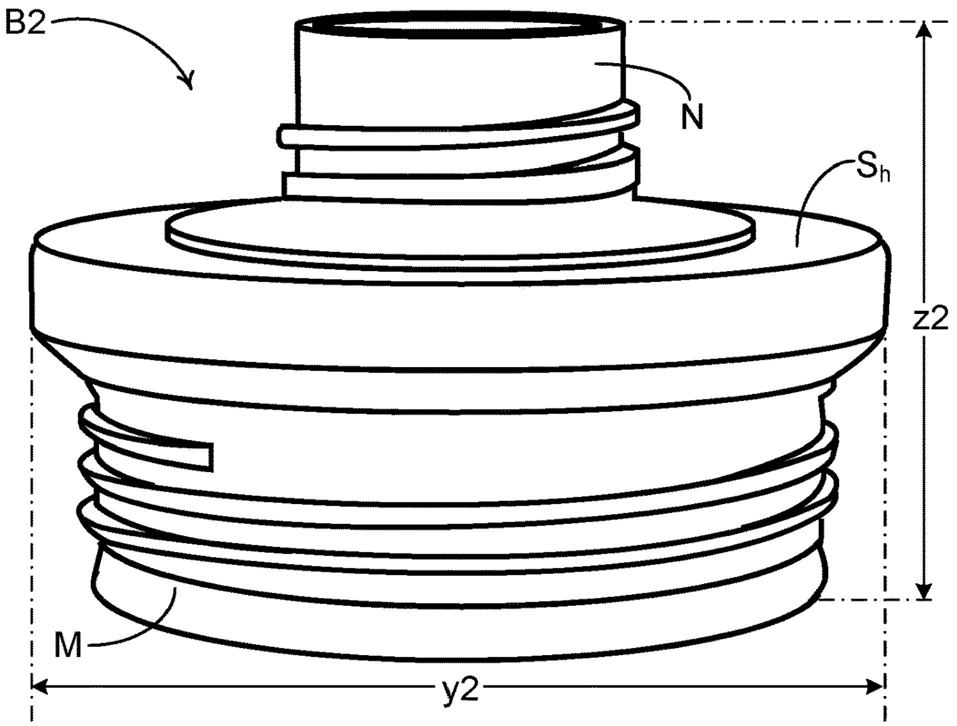

Referring to FIG. 1, there is shown a plan view of a blank 10, according to an embodiment of the disclosure, capable of forming a packaging structure 90 in the form of a display card 91, as shown in FIGS. 2 and 3 for containing and carrying at least one primary product. The primary product may take the form an accessory for a reusable drinks vessel or bottle such as, but not limited to, the articles B1, B2 shown in FIGS. 4A and 4B. The blank 10 forms a secondary package for packaging the at least one primary product container or package.

The blank 10 is formed from a sheet of suitable substrate. It is to be understood that, as used herein, the term "suitable substrate" includes all manner of foldable sheet material such as paperboard, corrugated board, cardboard, plastic, combinations thereof, and the like. It should be recognised that one or other numbers of blanks may be employed, where suitable, for example, to provide the carrier structure described in more detail below.

The packaging structures 90 described herein may be formed from a sheet material such as paperboard, which may be made of or coated with materials to increase its strength. An example of such a sheet material is tear-resistant NATRALOCK® paperboard made by WestRock Company. It should be noted that the tear resistant materials may be provided by more than one layer, to help improve the tear-resistance of the package. Typically, one surface of the sheet material may have different characteristics to the other surface. For example, the surface of the sheet material that faces outwardly from a finished package may be particularly smooth and may have a coating such as a clay coating or other surface treatment to provide good printability. The surface of the sheet material that faces inwardly may, on the other hand, be provided with a coating, a layer, a treatment or be otherwise prepared to provide properties such as one or more of tear-resistance, good glue-ability, heat sealability, or other desired functional properties.

The tear resistant layer may be disposed over the uncoated side of the paperboard substrate and may be formed of polymeric material and secured to the substrate. The tear resistant layer imparts toughness to the laminate structure. Suitable tear resistant materials may include, but not be limited to, tear resistant laminated sheet material, e.g., NATRALOCK®, which may include a layer of an n-axially oriented film, e.g. MYLAR®, which is a bi-axially oriented polyester, oriented nylon, cross-laminated polyolefin or high density polyolefin. The orientation and cross-laminated structure of these materials contribute to the tear resistant characteristic. Also, tear resistance may be attributed to the chemical nature of the tear resistant material such as extruded metallocene-catalysed polyethylene (mPE).

Alternatively, the tear resistant layer may be a layer of linear low-density polyethylene (LLDPE). In embodiments where linear low-density polyethylene (LLDPE) or mPE is used, it is not necessary to incorporate an adhesive layer. Other suitable materials having a high level of tear resistance may also be used.

The adhesive layer may be formed of polyolefin material such as a low density polyethylene (LDPE). The adhesive layer may be placed between the substrate and the tear resistant layer to secure the tear resistant layer to the substrate.

Turning to FIG. 1, there is illustrated a blank 10 for forming a display card or carrier 91 (see FIG. 2) according to an embodiment of the present disclosure. The blank 10 comprises a pair of main panels 12, 18 for forming a front panel 18 and a rear panel 12 of the display card 91.

The pair of main panels 12, 14 comprises a first panel 12 and a second panel 14 hingedly connected together by a pair of connection panels 14, 16. A first connection panel 14 forms a handle or hanger panel 14 and is hingedly connected to the rear panel 12 by a hinged connection in the form of a fold line 13. The first connection panel 14 is arranged to be secured to an upper portion 12B of the rear panel 12, the upper portion 12B being disposed adjacent to the fold line 13. A second connection panel 16 forms a top or end closure panel 16 and is hingedly connected to the first connection panel 14 by a hinged connection in the form of a fold line 15. The second connection panel 16 is hingedly connected to the front panel 18 by a hinged connection in the form of a fold line 17.

The blank 10 comprises a pair of side panels 20, 22 hingedly connected to opposing sides of the front panel 18 by respective hinged connections in the form of fold lines 19, 21.

The blank 10 comprises first and second wing panels 24, 26 hingedly connected to a respective one of the first and second side panels 20, 22 by hinged connections in the form of fold lines 23, 25 respectively.

The first and second wing panels 24, 26 form securing panels and are arranged to be secured to opposing marginal side portions 12C, 12D of the rear panel 12.

Optionally, the first connection panel 14 and the upper portion 12B of the rear panel 12 each comprise a cutaway for forming a hook or hanger device. The illustrated embodiment comprises a first hanger aperture A5 in the first connection panel 14 and a second hanger aperture A6 in the upper portion 12B of the rear panel 12. The first and second hanger apertures A5, A6 are arranged to be disposed in registry with each other when the first connection panel 14 is folded about fold line 13 to be disposed in face contacting relationship with the upper portion 12B of the rear panel 12.

The front panel 18 and rear panel 12 each comprise at least one aperture A1, A2, A3, A4 for receiving and supporting an article B1, B2. In the illustrated embodiment the front panel 18 and rear panel 12 each provide two apertures A1, A2, A3, A4, the two apertures A1, A2, A3, A4 being arranged in pairs for receiving and supporting a respective one of a pair of articles B1, B2. The pair of articles B1, B2 may be configured to mate together. The second article B2 in the illustrated embodiment in configured to mate with a fluid container or drinking vessel (not shown). The second article B2 reduces the dimension of an opening in an end of the fluid container. The first article B1 provides an end closure for sealing an opening in an end of the second article B2 and is adapted to be mounted to the second article B2.

The rear panel 12 comprises a first article receiving aperture A1 and a second article receiving aperture A2. The second article receiving aperture A2 is spaced apart from the first article receiving aperture A1. The second article receiving aperture A2 is arranged to be disposed above or over the first article receiving aperture A1 when the package 90 is in a normal orientation, that is to say with free end edges of the front panel 18 and rear panel 12 at rest upon a surface or when the package 90 is hung or suspended from a support structure or display apparatus (not shown).

The front panel 18 comprises a third article receiving aperture A3 and a fourth article receiving aperture A4. The third article receiving aperture A3 is spaced apart from the fourth article receiving aperture A4 by a distance d. The third article receiving aperture A3 is arranged to be disposed above or over the fourth article receiving aperture A4 when the package 90 is in a normal orientation, that is to say with free ends edge of the front panel 18 and rear panel 12 at rest upon a surface or when the package 90 is hung or suspended from a support structure or display apparatus (not shown).

The article receiving apertures A1, A2, A3, A4 each provide at least one end stop limiting travel of an article B1, B2 in at least one direction.

The second article receiving aperture A2 and the third article receiving aperture A3 each define edge portions in the front and rear panels 18, 12 providing a first and second end stop E1, E2 respectively. The first and second end stops E1, E2 are arranged to define a plane and provide a ledge or shelf upon which the first article B1, illustrated in FIG. 4A, rests.

The first article receiving aperture A1 and the fourth article receiving aperture A4 each define edge portions in the front and rear panels 18, 12 providing a third and fourth end stop E3, E4 respectively. The third and fourth end stops E3, E4 are arranged to define a plane and provide a ledge or shelf upon which the second article B2, illustrated in FIG. 4B, rests.

The first article receiving aperture A1 and the fourth article receiving aperture A4 may be identical in shape and dimension. The first article receiving aperture A1 comprises a first maximum height dimension $h_x$1. The fourth article receiving aperture A4 comprises a fourth maximum height dimension $h_x$4. The first article receiving aperture A1 comprises a first maximum width dimension w1. The fourth article receiving aperture A4 comprises a fourth maximum width dimension w4. The first maximum height dimension $h_x$1 is equal to the fourth maximum height dimension $h_x$4. The first maximum width dimension w1 is equal to the fourth maximum width dimension w4.

The third article receiving aperture A3 may be larger in dimension than the second article receiving aperture A2. The second article receiving aperture A2 comprises a second height dimension h2 and a second width dimension w2. The third article receiving aperture A3 comprises a third height dimension h3 and a third width dimension w3. The second maximum height dimension h2 is less than the third maximum height dimension h3. The second maximum width dimension w2 is less than the third maximum width dimension w3.

The front panel 18 comprises a first height dimension x1, the rear panel 12 comprises a second height dimension x2; the second height dimension x2 is greater than the first height dimension x1. The first connection panel 14 comprises a third height dimension x2−x1 equal to the difference between second height dimension x2 and the first height dimension x1.

The third article receiving aperture A3 is spaced apart from the fold line 17, connecting the top panel 16 thereto, by a spacing dimension s. In this way a retention element 18B is provided by a portion of the front panel 18 disposed between third article receiving aperture A3 and the fold line 17.

The third article receiving aperture A3 and the second article receiving aperture A2 allow forward and rearward portions, respectively, of the first article B1 to project outwardly of an interior chamber of the carrier 91. The interior chamber of the carrier 91 is defined by the front panel 18, rear panel 12, opposing side panels 20, 22 and top panel 16. The first article B1 has a maximum width dimension y1 and a maximum height dimension z1. The maximum height dimension z1 is greater than the second height dimension h2. The maximum height dimension z1 is greater than the third height dimension h3. The maximum width dimension y1 is greater than the second width dimension w2. The maximum width dimension y1 is greater than the third width dimension w3.

The first article receiving aperture A1 and the fourth article receiving aperture A4 allow forward and rearward portions, respectively, of the second article B2 to project outwardly of an interior chamber. The second article B2 has a second article maximum width dimension y2 and a second article maximum height dimension z2. The second article maximum height dimension z2 is less than or equal to the first maximum height dimension $h_x 1$. The second article maximum height dimension z2 is less than or equal to the fourth height dimension h4. The second article maximum width dimension y2 is greater than the first width dimension w1. The second article maximum width dimension y2 is greater than the fourth width dimension w4.

The front panel 18 comprises a width dimension w1. The fourth width dimension w4 may be equal to the width dimension of the front panel 18. The third width dimension w3 may be equal to the width dimension of the front panel 18. The first width dimension w1 may be equal to the width dimension of the front panel 18. The second width dimension w2 may be less than the width dimension of the front panel 18.

The first article receiving aperture A1 and the fourth article receiving aperture A4 each comprises a tab or tongue T1, T4. The tabs T1, T4 reduce the height dimensions of portions of the first and fourth article receiving apertures A1, A4. The tabs T1, T4 define height dimensions of said portions of the first and fourth article receiving apertures A1, A4, as indicated in FIG. 1 by dimension line $h_n 1$, which are less than the second article maximum height dimension z2.

The second article B2 comprises an opening or recess in at least one end thereof. The tabs T1, T4 are received in an opening or recess in one end of the second article B2. The tabs T1, T4 engage the second article B2 and prevent or at least inhibit removal of the second article B2 from the interior chamber of the carrier 91 though either of the first and fourth article receiving apertures A1, A4.

The side walls 20, 22 of the carrier 91 are divergently arranged with respect each other such that the interior chamber of the carrier 91 is wider in dimension proximate the rear panel 12 than it is proximate the front panel 18. The dimension line w1, shown in FIG. 1, indicates the width of the front of the interior chamber and the dimension line w6, shown in FIG. 1, indicates the width of the rear of the interior chamber.

Each of the first article maximum width dimension y1 and the second article maximum width dimension y2 is greater than the width w1 of the front of the interior chamber and is less than the width w6 of the rear of the interior chamber.

The first article receiving aperture A1 and the fourth article receiving aperture A4 are each shaped to define shoulders. An upper portion of the first and fourth article receiving apertures A1, A4 is narrower than an intermediate portion. The shoulders of the first and fourth article receiving apertures A1, A4 define edges E6, E7 respectively. The edges E6, E7 provide end stops reducing or limiting travel of the second article B2 in a direction parallel to a tubular or longitudinal axis of the carrier 91. The edges E6, E7 are adapted to engage with shoulders portions Sn of the second article B2.

Turning to the construction of the package 90 as illustrated in FIG. 3, the display card 91 can be formed by a series of sequential folding operations. The folding process is not limited to that described below and may be altered according to particular manufacturing requirements.

Figure 5:
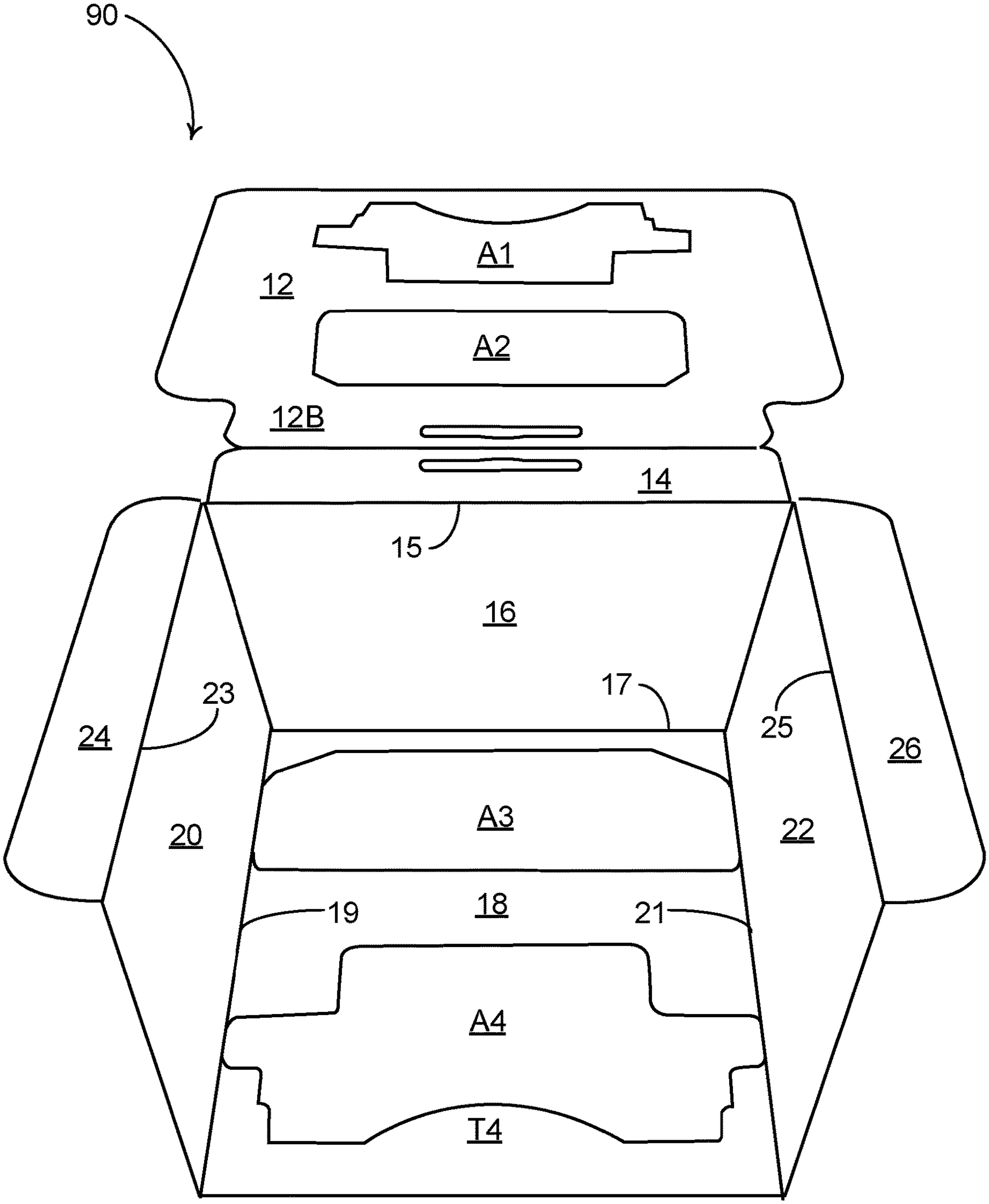
FIG. 5 illustrates a stage of construction of the product package of FIG. 3.

The blank 10 is folded about fold line 17 such that the second connection panel 16 is brought into perpendicular relationship with the front panel 18. The blank 10 may optionally be folded about fold line 15 such that the first connection panel 14 (and the rear panel 12) is brought into perpendicular relationship with the second connection panel 16, as shown in FIG. 5. In other embodiments the first connection panel 14 and the rear panel 12 remain coplanar with the second connection panel 16 until the carrier is loaded with the first and second articles B1, B2.

The blank 10 is folded about fold line 19 such that the first side panel 20 is folded out of the plane of the front panel 18, the first side panel 20 is aligned with a side edge of the second connection panel 16. The blank 10 is folded about fold line 23 such that the first wing panel 24 is brought into coplanar relationship with the first connection panel 14.

The blank 10 is folded about fold line 21 such that the second side panel 22 is folded out of the plane of the front panel 18, the second side panel 22 is aligned with an opposing side edge of the second connection panel 16. The blank 10 is folded about fold line 25 such that the second wing panel 26 is brought into coplanar relationship with the first connection panel 14 and the first wing panel 24.

In this way a trough is formed, the trough is closed at one end by the second connection panel 16. The trough defines part of an interior chamber of the carrier 91.

The trough is loaded with the first article B1 and the second article B2. A portion of the first article B1 is received by the third aperture A3. A portion of the second article B2 is received by the fourth aperture A4. The tab T4 is received in an opening at one end of the second article B2.

Once the trough is loaded with the first and second articles B1, B2 the rear panel 12 is folded into face to face relationship with the first and second wing panel 24, 26.

In some embodiments, in order to facilitate engagement of the tab T1 of the first aperture A1 within the opening in the second article B2 the blank 10 may be folded about fold line 13 and about folded about fold line 15. The first connection panel 14 may be folded out of the coplanar arrangement with the first and second wing panels 24, 26 shown in FIG. 5. In this way the first connection panel 14 provides clearance for the tab T1 in the rear panel 12 to pass a lower edge of the second article B2. The rear panel 12 is subsequently moved longitudinally to insert the tab T1 of the rear panel 12 in the opening in the end of the second article B2.

The first connection panel 14 is folded into, or returned to, coplanar arrangement with the first and second wing panels 24, 26, the rear panel 12 is brought into face to face contacting relationship with the first and second wing panels 24, 26 and the first connection panel 14. In doing so a portion of the first article B1 extends through the second aperture A2 and a portion of the second article B2 extends through the first aperture A1.

The rear panel 12 is secured to each of the first and second wing panels 24, 26 and to the first connection panel 14.

In some embodiments this may be done by heat sealing or radio frequency (RF) sealing or welding. The substrate of the blank 10 may comprise a coating or layer on at least one side to provide a bonding surface which responds to such treatment. A bonding surface of the rear panel 12 is brought into face to face contacting relationship with a bonding surface of the first connection panel 14, the first wing panel 24, and the second wing panel 26. In some embodiments, the bonding coating or layer may also serve to provide a tear resistant layer. In other embodiments, glue or other adhesive treatment may be applied to the inner surface of the panels 12, 14, 24, 26 prior to bringing them into face contacting relationship.

The rear panel 12 may be secured to each of the first connection panel 14, the first wing panel 24, and the second wing panel 26 simultaneously.

The assembled package 90 is shown in FIG. 3. The top panel 16 and edges E1, E2 of the second and third apertures A2, A3 prevent or inhibit movement of the first article B1 in a longitudinal direction z. The front panel 18, rear panel 18 and side panels 20, 22 prevent or inhibit movement of the first article B1 in directions x, y perpendicular to the longitudinal direction z.

The end stops provided by edges E3, E4, E6, E7 prevent or inhibit movement of the second article B2 in the longitudinal direction z. The front panel 18, rear panel 18 and side panels 20, 22 prevent or inhibit movement of the second article B1 in the directions x, y perpendicular to the longitudinal direction z.

The first and fourth article apertures A1, A4 are configured to expose the both upper and lower edges of the second article B2 to view.

The second and third article apertures A2, A3 are configured to expose a substantial portion of the first article B1 to view. Upper portions of the front and rear panel 18, 12 provide retention devices for engaging with a handle H of the first article B1 so as to prevent or inhibit egress of the first article B1 through the second or third article aperture A2, A3. The second and third article apertures A2, A3 expose a void V in the first article B1, in this way the consumer can see through the package 90.

The present disclosure provides a package 90 comprising a carrier 91, in the form of a display card, and at least one product B1, B2 mounted therein. The carrier 91 comprises an interior chamber defined in part by a front panel 18 and a rear panel 12. The carrier 91 comprise a pair of side walls 20, 20 The pair of side walls 20, 20 may be arranged divergently with respect to each other.

The front panel 18 comprises at least one aperture A3, A4 through which a portion of the at least one product B1, B2 passes or extends. The rear panel 12 comprises at least one second aperture A1, A2 through which a portion of the at least one product B1, B2 passes or extends.

That is to say the maximum depth of the interior chamber is less than the maximum depth of the at least one product B1, B2.

The at least one aperture A3, A4 and the at least one second aperture A1, A2 define edges of the front and rear panel 18, 12 which provide a ledge upon which the at least one product B1, B2 rests.

The front panel 18 comprises at least one aperture A3, A4 having a maximum width equal to the width w1 of the front panel 18.

The rear panel 12 comprises a width dimension w5 greater than the width w1 of the front panel 18. The rear panel 12 comprises at least one aperture A1, A2 having a maximum width equal to or less than the maximum width of the at least one aperture A3, A4 in the front panel 18.

At least one first or second aperture A1, A4 may comprise a tab T1, T4 which is received in an orifice or recess in the at least one product B1, B2. The at least one first or second aperture A1, A4 may have a maximum height dimension equal to or greater than the height of the at least one product B1, B2. The at least one product B1, B2 may comprise a first region N having a first width dimension and a second region M having a second width dimension and a transition region $S_h$ between the first and second region N, M. The at least one first or second aperture A1, A4 may be shaped to engage the transition region $S_h$ so as to provide an end stop limiting travel or movement of the at least one product B1, B2.

The at least one product B1 may comprises a body C and handle H mounted thereto, an opening, void or recess V is defined between the body C and handle H. At least one first or second aperture A2, A3 may be configured to expose to view the body C and void V of the at least one product B1. At least one first or second aperture A2, A3 may expose to view the body C and void V across the entire extent of their height. At least a portion of the handle H may be retained between a portion of the front and rear panels 18, 12.

The interior chamber comprises a minimum width dimension w1 and a maximum width dimension w6. The at least one product B1, B2 comprises a maximum width dimension y1, y2 which is greater than minimum width dimension w1 of the interior chamber and less than maximum width dimension w6 of the interior chamber.

Each of the first and second side walls 20, 20 may comprise a wing panel 24, 26 hingedly connected thereto and secured in face to face relationship with marginal side portions of the rear panel 12.

The front and rear panels 18, 12 may be hingedly connected to each other by a pair of hinged connecting panels 14, 16, a first one of the pair of hinged connecting panels 14, 16 being secured in face to face relationship with an upper portion of the rear panel 12. A second one of the pair of hinged connecting panels 14, 16 providing an end closure panel, in the form of a top panel in the illustrated embodiment, closing an end of the interior chamber.

The rear panel 12 may comprises a first aperture A1 and a second aperture A2. A portion of a first product B1 passes or extends through first aperture A1 and portion of a second product B2 passes or extends through second aperture A2. The front panel 18 may comprise a third aperture A1 and a fourth aperture A2. A portion of the first product B1 passes or extends through third aperture A3 and portion of the second product B2 passes or extends through fourth aperture A4.

The first and fourth apertures A1, A4 each provide a pair of opposed end stops limiting travel or movement of the second product B2 in opposing directions parallel to a tubular axis defined by the front panel 18, rear panel 12, first side panel 20 and second side panel 22.

The second and third apertures A2, A3 each provide a first end stop limiting travel or movement of the first product B1 in a first direction parallel to the tubular axis and the end closure panel provides a second end stop limiting travel or movement of the first product B1 in a second direction opposing the first direction.

It can be appreciated that various changes may be made within the scope of the present invention. For example, the size and shape of the panels may be adjusted to accommodate articles of differing size or shape.

It will be recognised that as used herein, directional references such as "top", "bottom", "base", "front", "back", "end", "side", "inner", "outer", "upper" and "lower" do not necessarily limit the respective panels to such orientation, but may merely serve to distinguish these panels from one another.

As used herein, the terms "hinged connection" and "fold line" refer to all manner of lines that define hinge features of the blank, facilitate folding portions of the blank with respect to one another, or otherwise indicate optimal panel folding locations for the blank. Any reference to "hinged connection" should not be construed as necessarily referring to a single fold line only; indeed a hinged connection can be formed from two or more fold lines wherein each of the two or more fold lines may be either straight/linear or curved/curvilinear in shape. When linear fold lines form a hinged connection, they may be disposed parallel with each other or be slightly angled with respect to each other. When curvilinear fold lines form a hinged connection, they may intersect each other to define a shaped panel within the area surrounded by the curvilinear fold lines. A typical example of such a hinged connection may comprise a pair of arched or arcuate fold lines intersecting at two points such that they define an elliptical panel therebetween. A hinged connection may be formed from one or more linear fold lines and one or more curvilinear fold lines. A typical example of such a hinged connection may comprise a combination of a linear fold line and an arched or arcuate fold line which intersect at two points such that they define a half moon-shaped panel therebetween.

As used herein, the term "fold line" may refer to one of the following: a scored line, an embossed line, a debossed line, a line of perforations, a line of short slits, a line of half-cuts, a single half-cut, an interrupted cutline, a line of aligned slits, a line of scores and any combination of the aforesaid options.

It should be understood that hinged connections and fold lines can each include elements that are formed in the substrate of the blank including perforations, a line of perforations, a line of short slits, a line of half-cuts, a single half-cut, a cutline, an interrupted cutline, slits, scores, any combination thereof, and the like. The elements can be dimensioned and arranged to provide the desired functionality. For example, a line of perforations can be dimensioned or designed with degrees of weakness to define a fold line and/or a severance line. The line of perforations can be designed to facilitate folding and resist breaking, to facilitate folding and facilitate breaking with more effort, or to facilitate breaking with little effort.

The phrase "in registry with" as used herein refers to the alignment of two or more elements in an erected carton, such as an aperture formed in a first of two overlapping panels and a second aperture formed in a second of two overlapping panels. Those elements in registry with each other may be aligned with each other in the direction of the thickness of the overlapping panels. For example, when an aperture in a first panel is "in registry with" a second aperture in a second panel that is placed in an overlapping arrangement with the first panel, an edge of the aperture may extend along at least a portion of an edge of the second aperture and may be aligned, in the direction of the thickness of the first and second panels, with the second aperture.

The invention claimed is:

1. A carrier for packaging at least one article, the carrier comprising:
- a pair of main panels, each substantially defining a respective plane, the pair of main panels comprising:
  - a front panel; and
  - a rear panel, wherein the rear panel comprises a width dimension greater than the width of the front panel,
- at least one first opening provided in the front panel for receiving a first portion of an article;
- at least one second opening provided in the rear panel for receiving a second portion of the article;
- a first end stop for limiting travel of the article in at least one direction, the first end stop comprising:
  - a first edge portion that is defined by a portion of the at least one first opening, the first edge portion extending along an edge created by the at least one first opening in the front panel; and
  - a second edge portion that is defined by a portion of the at least one second opening, the second edge portion extending along an edge created by the at least one second opening in the rear panel,
  - wherein the second edge portion is coplanar with the first edge portion in a plane that is spaced apart from a lowermost edge of at least one of the front panel and the rear panel.

2. A carrier according to claim 1 comprising a second end stop provided by a third edge portion of the front panel, the third edge portion being defined by a further portion of the at least one first opening; and a fourth edge portion of the rear panel, the fourth edge portion being defined by a further portion of the at least one second opening.

3. A carrier according to claim 2 wherein the fourth edge portion is coplanar with the third edge portion.

4. A carrier according to claim 1 comprising a second end stop provided by an end closure panel extending between the front panel and the rear panel.

5. A carrier according to claim 1 wherein the front panel is hingedly connected to the rear panel by an end closure panel and a connecting panel, wherein the connecting panel is disposed in face to face relationship with the rear panel.

6. A carrier according to claim 1 wherein a first side panel is hingedly connected to a first side of the front panel and a second side panel is hingedly connected to a second opposing side of the front panel.

7. A carrier according to claim 6 wherein a first wing panel is hingedly connected to the first side panel and is secured to the rear panel in face to face relationship therewith.

8. A carrier according to claim 6 wherein a second wing panel is hingedly connected to the second side panel and is secured to the rear panel in face to face relationship therewith.

9. A carrier according to claim 1 comprising a first retention device for retaining the at least one article and provided by a tab in each of the front and rear panels and defined by a portion of the at least one first opening and the at least one second opening respectively, the tabs being insertable into an orifice in an end of the at least one article.

10. A carrier according to claim 1 comprising a first retention device for retaining the at least one article and provided by a tab in at least one of the front and rear panels and defined by a portion of the at least one first opening or the at least one second opening respectively, each tab being insertable into an orifice in an end or base of the at least one article.

11. A carrier according to claim 9 comprising a second retention device for retaining the at least one article and provided by parts of the front and rear panels and defined by sections of the at least one first opening and the at least one second opening, said sections opposing the edge portions of the front and rear panels defining the first end stop.

12. A carrier according to claim 1 wherein the at least one first opening has a maximum width equal to the width of the front panel.

13. A carrier according to claim 1 wherein the at least one second opening has a maximum width equal to or less than the maximum width of the at least one first opening in the front panel.

14. A carrier according to claim 6 comprising an interior chamber defined, at least in part, by the front panel, rear panel, and first and second side panels, the interior chamber comprises a minimum width dimension and a maximum width dimension, the at least one article comprises a maximum width dimension which is greater than minimum width dimension of the interior chamber and less than maximum width dimension of the interior chamber.

15. A carrier according to claim 1 wherein the at least one first opening has a maximum width which is less than a maximum width dimension of the at least one article.

16. A carrier according to claim 15 wherein the at least one second opening has a maximum width which is less than the maximum width dimension of the at least one article.

17. A carrier for packaging a pair of articles, the carrier comprising:

- a pair of main panels, each substantially defining a respective plane, the pair of main panels comprising:
  - a front panel; and
  - a rear panel,
- a first opening provided in the rear panel for receiving a first portion of a first article;
- a second opening provided in the rear panel for receiving a first portion of a second article;
- a third opening provided in the front panel for receiving a second portion of the second article;
- a fourth opening provided in the front panel for receiving a second portion of the first article;
- a first end stop for limiting travel of the first article in a first direction, the first end stop comprising:
  - a first edge portion that is defined by a portion of the first opening, the first edge portion extending along an edge created by the first opening in the rear panel; and
  - a second edge portion that is defined by a portion of the fourth opening, the second edge portion extending along an edge created by the fourth opening in the front panel and being coplanar with the first edge portion of the rear panel in a plane that is spaced apart from a lowermost edge of at least one of the front panel and the rear panel;
- a second end stop for limiting travel of the second article in the first direction, the second end stop comprising:
  - at least one second edge portion of the rear panel that is defined by a portion of the second opening, the at least one second edge portion of the rear panel extending at least along an edge created by the second opening in the rear panel;
  - and at least one second edge portion of the front panel that is defined by a portion of the third opening, the at least one second edge portion of the front panel extending at least along an edge created by the third opening in the front panel and being coplanar with the at least one second edge portion of the rear panel.

18. A carrier according to claim 17 comprising a third end stop for limiting travel of the first article in a second direction, the second direction opposing the first direction, the third end stop being provided by: at least one third edge portion of the rear panel, the at least one third edge portion of the rear panel being defined by a portion of the first opening; and at least one fourth edge portion of the front panel, the at least one fourth edge portion of the front panel being defined by a portion of the fourth opening and being coplanar with the at least one third edge portion of the rear panel.

19. A carrier according to claim 18 comprising a fourth end stop for limiting travel of the second article in the second direction, the fourth end stop being provided by: an end closure panel hingedly connected to an end edge of the front panel.

20. A carrier according to claim 17 comprising a first retention device for retaining the first article and provided by a tab in each of the front and rear panels and defined by portions of the first and fourth openings, the tabs being insertable into an orifice in an end of the first article.

21. A carrier according to claim 20 comprising a second retention device for retaining the second article and provided by parts of the front and rear panels and defined by sections of the second and third openings, said sections of the second and third openings opposing the portions of the second and third openings defining the second edge portions in the front and rear panels.

22. A package comprising a carrier and one or more articles, the carrier comprising:

- a front panel;
- a rear panel;
- at least one first opening provided in the front panel, in which a first portion of an article is received;
- at least one second opening provided in the rear panel, in which a second portion of the article is received; and
- a first end stop provided by:
  - a first edge portion of the front panel, the first edge portion being defined by a portion of the at least one first opening; and
  - a second edge portion of the rear panel, the second edge portion being defined by a portion of the at least one second opening, wherein the second edge portion is coplanar with the first edge portion in a plane that is spaced apart from a lowermost edge of at least one of the front panel and the rear panel, wherein the lowermost edge is a free end edge.

23. A package according to claim 22 wherein the at least one first opening has a maximum width equal to the width of the front panel.

24. A package according to claim 22 wherein the rear panel comprises a width dimension greater than the width of the front panel.

25. A package according to claim 22 wherein the at least one second opening has a maximum width equal to or less than the maximum width of the at least one first opening in the front panel.

26. A package according to claim 22 wherein carrier comprises an interior chamber defined, at least in part, by the front panel, rear panel, a first side panel and a second side panel, the interior chamber comprises a minimum width dimension and a maximum width dimension, the at least one article comprises a maximum width dimension which is greater than minimum width dimension of the interior chamber and less than maximum width dimension of the interior chamber.

27. A package according to claim 22 wherein the at least one article comprises a maximum width dimension and the at least one first opening has a maximum width which is less than the maximum width dimension of the at least one article.

28. A package according to claim 27 wherein the at least one second opening has a maximum width which is less than the maximum width dimension of the at least one article.

29. A package comprising a carrier and a pair of articles, the carrier comprising:
- a front panel;
- a rear panel;
- a first opening provided in the rear panel, in which a first portion of a first article is received;
- a second opening provided in the rear panel, in which a first portion of a second article is received;
- a third opening provided in the front panel, in which a second portion of the second article is received;
- a fourth opening provided in the front panel, in which a second portion of the first article is received;
- a first end stop limiting travel of the first article in a first direction, the first end stop being provided by:
  - an edge portion of the rear panel, the edge portion of the rear panel being defined by a portion of the first opening; and
  - an edge portion of the front panel, the edge portion of the front panel being defined by a portion of the fourth opening and being coplanar with the edge portion of the rear panel in a plane that is spaced apart from a lowermost edge of at least one of the front panel and the rear panel; and
- a second end stop limiting travel of the second article in a first direction, the second end stop being provided by:
  - at least one second edge portion of the rear panel, the second edge portion of the rear panel being defined by a portion of the second opening; and
  - at least one second edge portion of the front panel, the second edge portion of the front panel being defined by a portion of the third opening and being coplanar with the second edge portion of the rear panel.

30. A package according to claim 29 wherein the third opening has a maximum width equal to the width of the front panel.

31. A package according to claim 29 wherein the fourth opening has a maximum width equal to the width of the front panel.

32. A package according to claim 30 wherein the second opening has a maximum width less than the maximum width of the third opening in the front panel.

33. A package according to claim 29 wherein the first opening has a maximum width equal to the maximum width of the fourth opening in the front panel.

34. A package according to claim 29 wherein the rear panel comprises a width dimension greater than the width of the front panel.

35. A package according to claim 29 wherein carrier comprises an interior chamber defined, at least in part, by the front panel, rear panel, a first side panel and a second side panel, the interior chamber comprises a minimum width dimension and a maximum width dimension, each of the pair of articles comprises a maximum width dimension which is greater than minimum width dimension of the interior chamber and less than maximum width dimension of the interior chamber.

36. A package according to claim 29 wherein the first article comprises a maximum width dimension and the first and fourth openings each have a maximum width which is less than the maximum width dimension of the first article.

37. A package according to claim 29 wherein the second article comprises a maximum width dimension and the second and third openings each have a maximum width which is less than the maximum width dimension of the second article.

38. A blank for forming a display card, the blank comprising:
- a front panel;
- a rear panel wherein the rear panel comprises a width dimension greater than the width of the front panel;
- a top panel hingedly connected to the front panel;
- a connection panel hingedly connected to the top panel and hingedly connected to the rear panel;
- first and second side panels hingedly connected to opposing sides of the front panel;
- a first wing panel hingedly connected to the first side panel;
- a second wing panel hingedly connected to the second side panel;
- wherein the first wing panel, the second wing panel and the connection panel provide securing panels for securing the display card in a setup condition, the blank further comprising:
- at least one first opening provided in the front panel for receiving a first portion of an article;
- at least one second opening provided in the rear panel for receiving a second portion of the article; and
- a first end stop provided by:
  - a first edge portion of the front panel, the first edge portion being defined by a portion of the at least one first opening; and
  - a second edge portion of the rear panel, the second edge portion being defined by a portion of the at least one second opening,
  - wherein the second edge portion is coplanar with the first edge portion in a plane that is spaced apart from a lowermost edge of at least one of the front panel and the rear panel.

* * * * *